United States Patent [19]

Sexton

[11] 4,406,473
[45] Sep. 27, 1983

[54] SAFETY STABILIZER FOR VEHICLE STEERING LINKAGE

[75] Inventor: Tilman L. Sexton, Atlanta, Ga.

[73] Assignee: Sexton Enterprises, Inc., Atlanta, Ga.

[21] Appl. No.: 327,952

[22] Filed: Dec. 7, 1981

[51] Int. Cl.³ .............................................. B62D 7/08
[52] U.S. Cl. .................................... 280/94; 267/8 R; 267/150
[58] Field of Search ................... 280/94, 90; 267/8 R, 267/150

[56] References Cited

U.S. PATENT DOCUMENTS

| | | | |
|---|---|---|---|
| 1,119,014 | 12/1914 | Harris | 280/94 |
| 1,167,240 | 1/1916 | Wood | 280/94 |
| 1,275,625 | 8/1918 | Stedman | 280/94 |
| 1,284,179 | 11/1918 | Coombs | 280/94 |
| 1,447,757 | 3/1923 | Cannon | 280/94 |
| 1,537,362 | 5/1925 | MacLellan | 280/90 |
| 1,564,662 | 12/1925 | Flemister | 280/94 |
| 1,625,224 | 4/1927 | Seawell | 280/94 |
| 1,745,119 | 1/1930 | Plank | 280/94 |
| 2,096,650 | 10/1937 | Del Rio | 280/94 |
| 2,132,304 | 10/1938 | Lee | 280/94 |
| 3,075,785 | 1/1963 | Crook | 280/94 |
| 3,420,542 | 1/1969 | Jordan | 280/94 |
| 3,437,163 | 4/1969 | Lemmerman | 280/94 |
| 3,583,515 | 6/1971 | Schwenk | 280/94 |
| 3,779,575 | 12/1973 | Mazur | 280/94 |
| 3,833,235 | 9/1974 | Worsham | . |
| 3,848,885 | 11/1974 | Hefren | . |
| 3,980,315 | 9/1976 | Hefren | 280/94 |
| 4,243,240 | 1/1981 | Shepherd, Sr. | . |

OTHER PUBLICATIONS

Monroe, 1980 Monroe Shock Absorber Catalog, 1980.
Heckethorn Manufacturing Company, Hydraulic Steering Stablizers, 1980.

*Primary Examiner*—Robert R. Song
*Attorney, Agent, or Firm*—George M. Thomas

[57] ABSTRACT

A self-centering shock dampening stabilizer is connected between a fixed point on a vehicle main frame member and a moving point in the steering linkage which interconnects the vehicle steerable wheels and steering gear. The stabilizer embodies an hydraulic cylinder in conjunction with a coil spring snubber which includes two opposing coils of equal tension acting on the opposite ends of the snubber and also acting on fixed elements at one end of the hydraulic cylinder and at the center of the snubber.

11 Claims, 5 Drawing Figures

SAFETY STABILIZER FOR VEHICLE STEERING LINKAGE

BACKGROUND OF THE INVENTION

The present invention seeks to satisfy a need for a safe, efficient and economical steering mechanism stabilizer in vehicles.

Steering stabilizers are known in the prior art and usually are spring devices which include threaded spring tension adjusters or equivalent means. The prior art steering stabilizers have tended to be awkward and unduly complicated, rendering them impractical to install on present-day automotive vehicles, as well as they do not have a positive center point or hydraulic retarder as to slow down rapid movement of the rod.

Nevertheless, it is desirable to stabilize the steering linkage while biasing it toward a positive center or straight-ahead condition, and the present invention accomplishes these aims in a very compact, convenient and practical unit which is connected between a vehicle frame member and a moving element of the steering linkage such as the tie rod. The device dampens shocks generated by external forces on the steerable wheels which otherwise tend to be transmitted back through the linkage to the steering wheel. Since the device is positive self-centering under the action of two opposing equal strength biasing springs, it tends to return the vehicle wheels to a positive center or straight-ahead position. The core of the stabilizer is embodied in a fluid tight cylinder or dampener, and this core is surrounded by a shell of a coil spring snubber containing the two-named biasing coils.

Other features and advantages of the invention will become apparent during the course of the following description.

DETAILED DESCRIPTION

Figure 1:
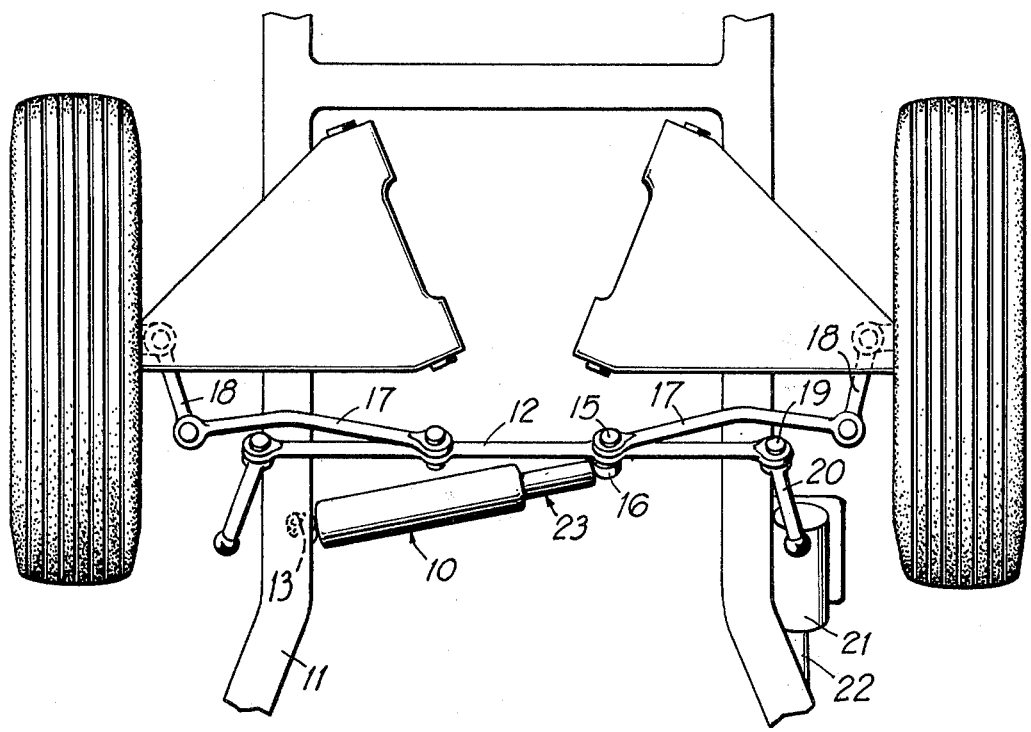
FIG. 1 is a bottom plan view of a vehicle steering mechanism equipped with the stabilizer according to the invention.
Figure 2:
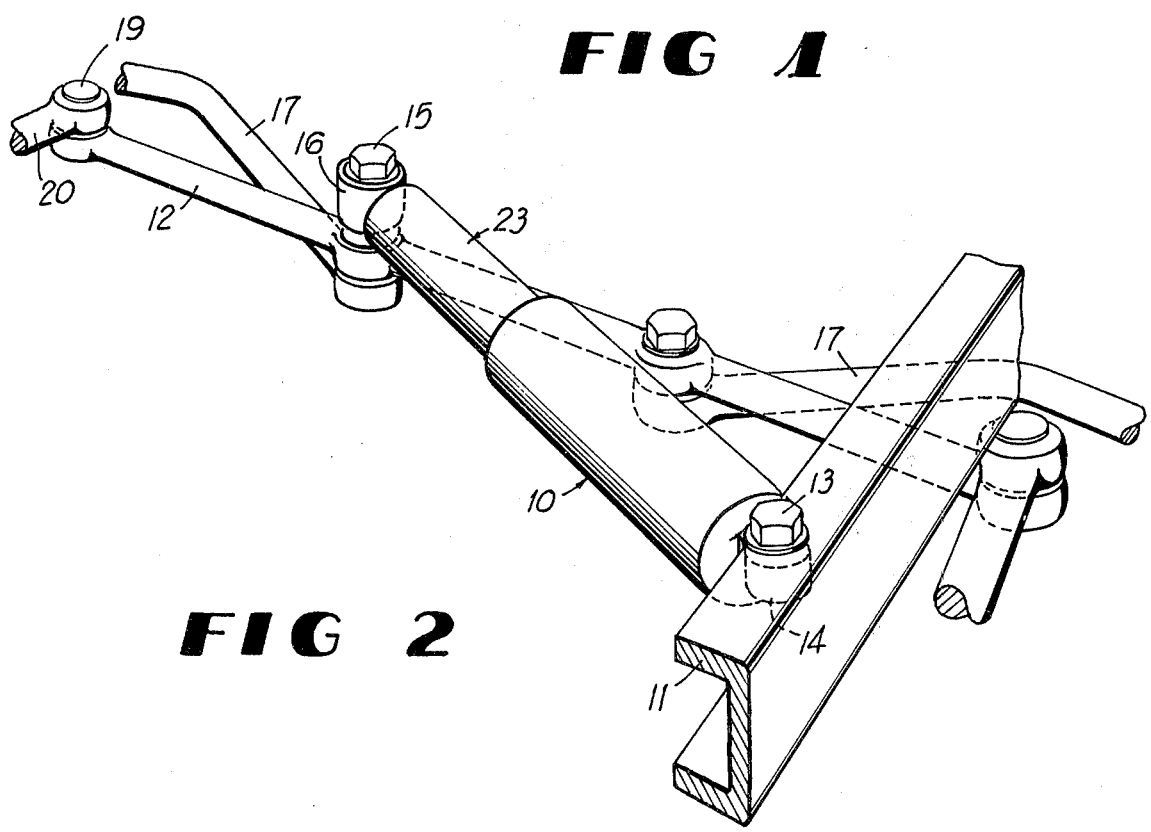
FIG. 2 is an enlarged fragmentary top perspective view of the invention.

Referring to the drawings in detail wherein like numerals designate like parts, a steering mechanism stabilizer 10 according to the invention is connected between a main frame member 11 of an automotive vehicle and a movable steering link 12. More particularly, a bolt 13 anchors one end of the stabilizer 10 to the frame member 11 by engaging through an eye 14 fixed to one end of the stabilizer 10. The other end of the stabilizer is similarly anchored by another bolt 15 to an eye 16 and through this eye to the steering link 12 at an intermediate point thereon.

The steering link 12 is connected through two shorter links 17 with steering arms 18 in a generally conventional manner as depicted in FIG. 1. The steering link 12 is also connected at one end by a pin or bolt 19 with the arm 20 of a steering gear 21 operatively connected with the vehicle steering wheel, not shown, through a steering column 22. The described steering linkage is largely conventional and its construction may vary somewhat in different models and types of vehicles. The safety stabilizer 10 is adapted for use with various types of steering linkages, and the invention is not limited to the particular steering linkage shown in the drawings.

Figure 3:
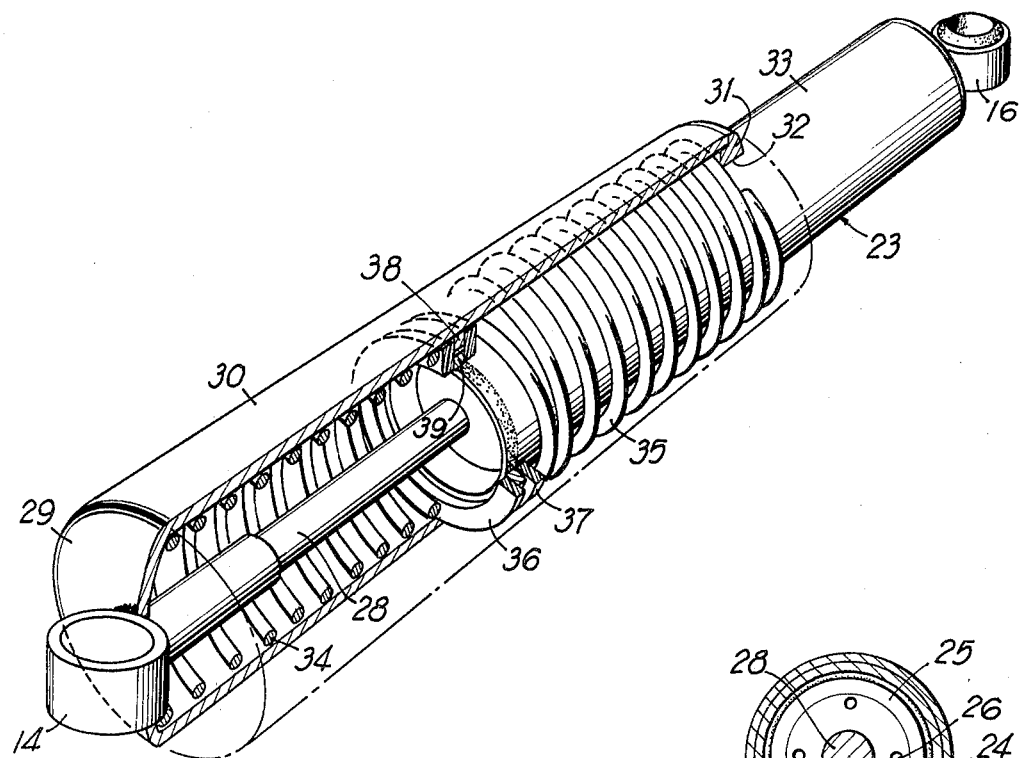
FIG. 3 is a perspective view of the stabilizer, partly in section.
Figure 5:
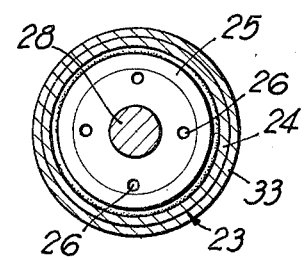
FIG. 5 is a transverse vertical section taken on line 5—5 of FIG. 4.
Figure 4:
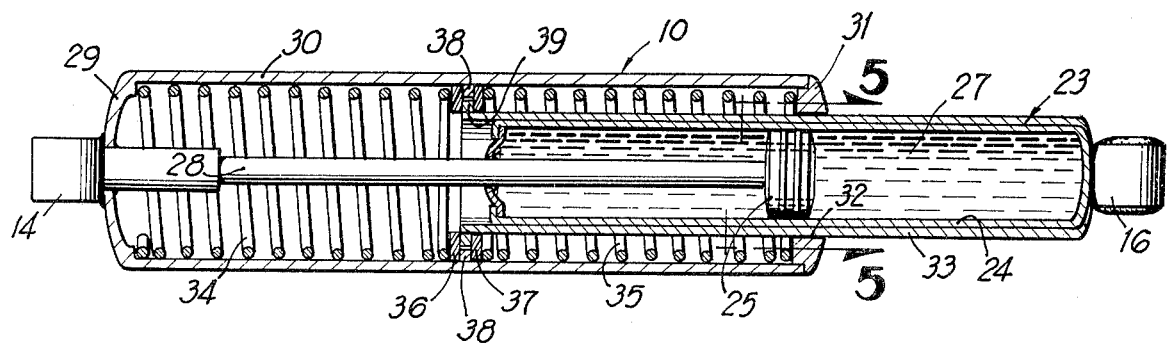
FIG. 4 is a central vertical longitudinal section through the stabilizer.

As shown primarily in FIGS. 3–5, the stabilizer 10 comprises a core element 23 having a cylinder 24 containing a piston 25 normally at the longitudinal center thereof. The piston has axial through ports 26, FIG. 5, to allow a viscous fluid 27 to flow therethrough with resistance.

The piston 25 is connected to a piston rod 28 which is fixed as by welding or otherwise to an end plate 29 of a larger cylindrical tube or shell 30 which telescopes over the core 23 of the stabilizer. The far end of the tube 30 has an end cap 31 fixed thereto and this end cap has a central opening 32 slidably receiving another tube 33 fixed on the exterior of cylinder 24.

Identical equal strength compression coil springs 34 and 35 are contained within the tube 30 in opposing coaxial relationship with their outer ends bearing against end plate 29 and end cap 31. The inner ends of these coils bear on movable thrust washers 36 and 37 within the tube 30, which washers are intervened by a pair of concentric coaxial rings 38 and 39 secured, respectively, to the bore of tube 30 at its longitudinal center and to the exterior of tube 33 at the inner end thereof.

It may be seen that the described coil spring arrangement renders the fluid shock cylinder 23 positive self-centering, that is, when under no external load the dampening piston 25 is biased to the longitudinal center of the cylinder 24, as shown in FIG. 4. Therefore, when the stabilizer 10 is installed on a vehicle as in FIG. 1, it will tend to bias the steering linkage to a positive center or straight-ahead position.

Additionally, in accordance with a major objective of the invention, the stabilizer prevents a variety of external forces from being transmitted through the steering linkage to the driver's steering wheel by dampening and absorbing the shocks in such forces. Referring to FIG. 4, when an external force tends to drive cylinder 23 to the left further into the snubbing tube 30, the restrictor ports 26 will dampen such forces effectively. Also, the fixed ring 39 of the cylinder 23 will push the left hand thrust washer 36 to the left compressing the coil 34 to further resist the external forces, and there will be no compression or any movement or change whatsoever in the opposing coil 35. When the external force is removed from the linkage, the coil 34 will automatically return the cylinder to its positive centered position and, in so doing, will tend to center the entire steering linkage.

When an external force on the steering linkage tends to move cylinder 23 to the right, FIG. 4, its fixed ring 39 will move thrust washer 37 and compress coil 35. Fixed ring 38 at this time prevents any movement or change in coil spring 34. The fluid shock absorber cylinder will dampen the external force and move it to the right and the coil spring 35 of the snubber will also aid in cushioning the force. When the force is dissipated or removed, the coil 35 will re-center the device to its normal state shown in FIG. 4. Thus, each coil 34 and 35 of the snubber is arranged to center the stabilizer automatically while the opposing coil is idle. The two coils respond to external forces in opposite directions. The cylinder 23 dampens forces on the device in either direction.

The stabilizing device is simple, compact and unitary. It is entirely practical and convenient to install. No cables, turnbuckles, external springs or other threaded adjusting means are required. The advantages of the device over the known prior art should be apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A stabilizer for a vehicle steering linkage constructed and arranged for connection between a fixed point on the vehicle and a moving element of the steering linkage, said stabilizer comprising a fluid filled cylinder including a first attaching element on one end portion thereof, a piston having fluid restrictor through-ports within said fluid filled cylinder and including a piston rod projecting from within said fluid filled cylinder beyond the other end of said fluid filled cylinder, a snubber cylinder telescoped over said fluid filled cylinder and being fixed to said piston rod and having a second attaching element thereon, said snubber cylinder having opposing end walls, fixed concentric elements on the inner surface of the snubber cylinder substantially at the longitudinal center thereof and on the exterior of the fluid filled cylinder adjacent said other end thereof, a pair of opposing coaxial equal strength coil springs within said snubber cylinder and having corresponding ends bearing on said end walls of the snubber cylinder, and movable-thrust elements in the snubber cylinder on opposite sides of the fixed concentric elements, the other corresponding ends of the coil springs bearing on said thrust elements, whereby axial displacement of said fluid filled cylinder relative to the snubber cylinder in either direction due to external forces enables one coil spring to automatically return the stabilizer to a positive centered position after dissipation or removal of an external force while the opposing coil spring remains inactive.

2. A stabilizer for a vehicle steering linkage as defined in claim 1, and said fixed concentric elements comprising a pair of concentric ring elements mounted to the inner surface of the snubber cylinder and to the outer surface of said fluid filled cylinder, and said thrust elements comprising a pair of thrust rings on opposite sides of said concentric ring elements, the combined radial widths of the concentric ring elements being substantially equal to the radial width of each thrust ring, the diameter of the coil springs and internal diameters of the thrust rings being greater than the outside diameter of said fluid filled cylinder enabling one coil spring and one thrust ring to engage each other about the exterior of said fluid filled cylinder to allow axial displacement thereof within said snubber cylinder.

3. A stabilizer for a vehicle steering linkage as defined in claim 2, and said springs comprising a pair of coil compression springs which are enclosed with the ring elements and thrust rings within the snubber cylinder.

4. In a wheeled vehicle steering mechanism including a steering gear and a movable steering linkage operatively connected between the steering gear and steerable wheels of the vehicle, said vehicle including a frame, the improvement comprising a stabilizer unit for the steering mechanism having its opposite ends connected between a fixed point on said frame and said linkage, said stabilizer unit comprising an automatic positive centering telescoping unit including a core in the form of a fluid filled cylinder and a surrounding coil spring snubber device including a snubbing tube, separate opposing coil springs of equal strength within the snubbing tube, and abutment means on the snubbing tube and said cylinder within the interior of the snubbing tube and enabling each coil spring separately to function as an automatic centering means for the stabilizer while the opposing coil spring remains inactive.

5. In a vehicle steering mechanism as defined in claim 4 and wherein said fluid filled cylinder includes a piston having fluid restrictor through-ports in the cylinder and including a piston rod having a fixed connection with the snubber device.

6. In a vehicle steering mechanism as defined in claim 5, and attaching eyes for the stabilizer unit on the opposite ends thereof, one eye being fixed to an end wall of the snubber device and the other eye being fixed to an end wall of the fluid filled cylinder.

7. In a vehicle steering mechanism as defined in claim 6, and the spring abutment means comprising concentric abutment rings fixed in the bore of said snubbing tube at the longitudinal center thereof and fixed on the exterior of said fluid filled cylinder near the interior end thereof within the snubbing tube, and a pair of movable thrust rings in the bore of the snubbing tube on opposite sides of said concentric abutment rings.

8. A stabilizer for a vehicle steering linkage constructed and arranged for connection between a fixed point on the vehicle and a moving element of the steering linkage of the vehicle, said stabilizer comprising a snubbing cylinder, an inner cylinder projecting longitudinally through one end portion of said snubbing cylinder and including one end portion positioned internally of said snubbing cylinder and another end portion protruding externally of said snubbing cylinder, piston means movably positioned in said inner cylinder and including a piston rod projecting from within said inner cylinder into said snubbing cylinder and connected to said snubbing cylinder, spring means for yieldably urging said inner cylinder to a centered position with its said one end portion located intermediate the ends of said snubbing cylinder, whereby axial displacement of the inner cylinder with respect to the snubbing cylinder in either direction is resisted by the spring means and the piston means, and the spring means tends to urge the inner cylinder back to its centered position.

9. A stabilizer for a vehicle steering linkage as defined in claim 8 and wherein said piston means comprises a piston with ports extending therethrough, and wherein said inner cylinder is filled with a fluid that moves through the ports of said piston as the piston moves longitudinally with respect to said inner cylinder.

10. A stabilizer for a vehicle steering linkage as defined in claim 8 and wherein said inner cylinder includes a projection at its said internal end portion extending radially outwardly therefrom into said snubbing cylinder, and wherein said spring means comprises a pair of aligned coil compression springs positioned within said snubbing cylinder, with one coil spring positioned within one end portion of said snubbing cylinder and surrounding said inner cylinder and the other coil spring positioned within the other end portion of said snubbing cylinder, and the adjacent end portions of said coil springs normally biased into engagement with opposite surfaces of the projection of said inner cylinder.

11. A stabilizer for a vehicle steering linkage as defined in claim 10 and wherein said snubbing cylinder includes at a position intermediate its ends a projection extending radially inwardly therefrom toward said inner cylinder, and wherein the adjacent end portions of said coil springs normally are biased into engagement with opposite surfaces of the projection of said inner cylinder.

* * * * *